Patented Mar. 9, 1937

UNITED STATES PATENT OFFICE 2,072,861

PROCESSES FOR THE CATALYTIC HYDROGENATION OF DICARBOXYLIC ANHYDRIDE

William J. Amend and Euclid W. Bousquet, Wilmington, Del., assignors to E. I. du Pont de Nemours & Company, Wilmington, Del., a corporation of Delaware No Drawing. Application September 29, 1934, Serial No. 746,144

13 Claims. (Cl. 260—123)

This invention relates to catalytic processes and more particularly to catalytic processes for the hydrogenation of anhydrides of dicarboxylic acids to the corresponding lactones.

The hydrogenation of phthalic anhydride to phthalide has been accomplished over nickel catalysts in the vapor-phase at about 200° C. Platinum-black catalysts have been used in the hydrogenation of naphthalic anhydrides to the corresponding naphthalides.

This invention has as an object a new process for the catalytic hydrogenation of anhydrides of dibasic acids to the corresponding lactones. A further object is the provision of a process utilizing hydrogenating metal salts of certain acidic oxides as catalysts in this hydrogenation. Other objects will appear hereinafter.

These objects are accomplished by the following invention wherein an intra-molecular anhydride of an aliphatic, aromatic, or alicyclic dicarboxylic acid is brought into contact with hydrogen in the presence of a catalyst, which catalyst comprises a hydrogenating metal or hydrogenating metal oxide intimately associated with an acidic oxide of chromium, vanadium, molybdenum, tungsten, titanium or uranium. The use of aliphatic, aromatic, and hydroaromatic solvents for the reaction products is also a part of the present invention. Suitable solvents may be such non-polar compounds as hydrocarbons and ethers or compounds of a more polar character such as esters, or phthalide itself.

The processes of the present invention are illustrated by the following examples:

Example 1

A copper chromite catalyst was prepared as follows: Fifteen hundred grams of copper nitrate dissolved in 4 liters of water was mixed with a solution containing 1000 grams of ammonium chromate in an equal volume of water. Ammonium hydroxide was added to neutralize the acidity developed during the precipitation of the copper ammonium chromate. The precipitate was filtered, dried, and ignited at a temperature of 400° C. after which it was extracted twice with dilute acetic acid. The resulting copper chromite powder was employed for hydrogenation without further treatment. Two thousand grams of phthalic anhydride and 160 grams of copper chromite, prepared as described, and 2000 grams of thiophene-free benzene were placed in an autoclave equipped for agitation. Hydrogen was introduced until the pressure reached 2600 pounds per square inch. The mixture was heated to 265° C. and agitated for 6 hours. During agitation the hydrogen pressure was maintained at 3900 pounds per square inch. The benzene solution was filtered to remove the catalyst and also any unchanged phthalic anhydride. The benzene solution was carefully washed with a 5–10% sodium carbonate solution to convert any toluic acid present to soluble sodium toluate which was separated from the phthalide solution by removing the aqueous layer. Several washings were necessary to remove all the toluic acid. Evaporation of the benzene gave 1100 grams of pure phthalide melting at 72°–73° C. and 340 grams of impure phthalide melting at 63–69° C., which made a total yield of 79.5% of the theoretical yield. One hundred and seventy-five grams, or 9.5% of the theoretical amount of toluic acid was recovered from the aqueous salt solution.

Example 2

One hundred and four grams of camphoric anhydride, 125 g. benzene, and 11 g. of copper chromite catalyst prepared as described in Example 1 were charged into a steel autoclave equipped for heating and agitation. Hydrogen was admitted to a pressure of 3000–4000 lbs./sq. in. and was maintained in this range while the contents of the tube were agitated for 8 hours at 260–280° C. The products of hydrogenation were cooled, filtered and evaporated to remove the greater part of the benzene solvent. The solid residue was treated with 5% sodium hydroxide to remove free acids. The residue was recrystallized from petroleum ether, yielding 58 g. of campholide melting at 208°–210° C. There was some evidence of the presence among the products of lesser quantities of a monobasic acid such as would be formed by the further hydrogenation of campholide.

In a similar manner one may carry out the preparation of 1–8 naphthalide by hydrogenation of the anhydride of 1–8 naphthalic anhydride.

Example 3

One hundred and fifty grams of phthalic anhydride and 12 grams of copper chromite catalyst prepared as described in Example 1 were charged into a steel autoclave equipped for heating and agitation. Hydrogen was admitted to a pressure of 3000–4000 lbs./sq. in. and the pressure was maintained in this range while the contents of the tube were agitated for 6 hours at 270° C. Subsequently, benzene was added and the reaction products were separated as described in Example 1. There was thus obtained 76 g. of phthalide (55.8 per cent conversion) and 5 g. of o-toluic acid (3.6 per cent conversion). In addition, approximately 30 per cent of the phthalic anhydride was recovered as the catalyst salt of phthalic acid. Therefore, the yield of phthalide based on phthalic anhydride consumed was 81 per cent.

In the above examples certain definite conditions of operation such as time, temperature and pressure have been indicated, but these may be varied within wide limits within the scope of the present invention. The preferred temperature for the process is the range from 100 to 450° C. but temperatures above and below this may be used although not so efficiently.

The preferred pressure for the process of the present invention lies within the range of 500 to 5000 lbs./sq. in., but pressures above and below this range may be employed, although usually lower pressures decrease the efficiency of the operation. The time of reaction is determined by the rate at which hydrogen is absorbed, which rate will vary depending on the temperature, pressure, catalyst and anhydride being hydrogenated. An excess of hydrogen is usually employed and may vary to as high as 1000% excess.

Although, in the examples, a liquid-phase operation was disclosed and a catalyst of but one composition, the invention is not limited to these conditions. Catalysts suitable for use according to the process of the present invention consist of a hydrogenating metal or a hydrogenating metal oxide associated with, combined with, or supported upon an acidic oxide of chromium, vanadium, molybdenum, tungsten, titanium or uranium, preferably in a lower valence stage. The hydrogenating metals useful in the process include zinc, iron, nickel, cobalt, copper, cadmium, silver and tin. The hydrogenating metal oxides include manganese and magnesium oxides. The catalysts and the method of their preparation described in U. S. Patent No. 1,964,000 are, in general, useful. They may be supported on kieselguhr, silica gel, pumice, etc. In the preferred embodiment of the invention a copper chromite catalyst is utilized, although successful hydrogenations may be carried out using chromites of other metals.

In the examples there is disclosed but one organic solvent, but other solvents for the hydrogenated compounds and non-solvents for the compound being hydrogenated may be employed. When employing catalysts of the chromite type such as copper and nickel chromites, aromatic and hydroaromatic solvents are preferred. Benzene and cyclohexane have been found to be satisfactory. Toluene, xylene, methylcyclohexane and di-methylcyclohexane may likewise be employed. The process may be operated, although in general not so efficiently, without the use of solvents. Because of the greater efficiency of the process using the solvents this represents a preferred phase of the invention.

The process may be employed in the liquid and the vapor phase and may be operated either as a batch or a continuous process.

The examples disclose the hydrogenation of the anhydrides of phthalic and camphoric acids, but other anhydrides represented by the general anhydride formula

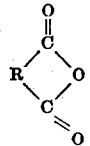

may be hydrogenated to the corresponding lactones

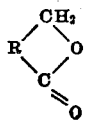

where R in the above formulae may be aromatic such as phenyl or naphthyl, or aliphatic such as $(CH_2)_n$ where $n$ equals 2, 3, or 4, or R may be a cycloalkyl ring as illustrated by cyclohexyl and cyclopentyl in hexahydrophthalic and camphoric anhydrides. Thus hexahydropthalic anhydride would give hexahydrophthalide. Furthermore, when R is aromatic, this nucleus may contain other constituent groups as for example, alkyl groups exemplified by anhydrides of 3- and 4-methyl-o-phthalic and 3,6-di-methyl phthalic acids which would give the corresponding methylated phthalides. While we prefer to use anhydrides of the above general formula in which the parent carboxyl groups of the anhydride are attached to adjacent carbon atoms in the R group as in the anhydrides of o-phthalic and hexahydro-o-phthalic acids, we may also use certain anhydrides in which the parent carboxyls are not in adjacent positions, as in camphoric anhydride and 1,8 naphthalic anhydride. Because of the greater utility of the products, as well as the greater availability of the dibasic acids, the anhydrides of the mono- and polynuclear aromatic dicarboxylic acids represent a preferred class of compounds to be hydrogenated to the corresponding lactones.

Certain anhydrides of dibasic acids, when heated, form the anhydride readily at temperatures within the temperature range indicated for hydrogenation of the anhydride. In such cases the hydrogenation of the acids themselves may be carried out in lieu of the anhydride and the process is to be regarded as falling within the scope of the invention.

The process of the present invention is of advantage in that the catalysts used in the process of the present invention are much less readily affected by the water formed in the reaction than are catalysts in the prior art. Increased yields are obtained and a purer product results.

As many apparently widely different embodiments of this invention may be made without departing from the spirit and scope thereof, it is to be understood that we do not limit ourselves to the specific embodiments thereof except as defined in the appended claims.

We claim:

1. Process for the preparation of a lactone of a hydroxy acid, comprising heating an intramolecular anhydride of a dicarboxylic acid of the class consisting of aliphatic, aromatic and alicyclic acids while intimately admixed with hydrogen, in the presence of a catalyst from the group of hydrogenating metals and hydrogenating metal oxides intimately associated with an acidic oxide of a metallic element of the group consisting of chromium, vanadium, molybdenum, tungsten, titanium and uranium in a lower valence stage, at a temperature of 100° to 450° C.

2. The process in accordance with claim 1 characterized in that the reaction is carried out in the liquid phase.

3. The process in accordance with claim 1 characterized in that the reaction is carried out in the liquid phase and in the presence of a solvent.

4. The process in accordance with claim 1 characterized in that the reaction is carried out in the liquid phase and in the presence of benzene.

5. Process for the preparation of a lactone of a hydroxy acid, comprising heating an intramolecular anhydride of an aromatic dicarboxylic acid while intimately admixed with hydrogen, in the presence of a catalyst from the group of hydrogenating metals and hydrogenating metal oxides intimately associated with an acidic oxide of a metallic element of the group consisting of chromium, vanadium, molybdenum, tungsten, titanium and uranium in a lower valence stage, at a temperature of 100° to 450° C.

6. The process in accordance with claim 5 characterized in that the reaction is carried out in the liquid phase.

7. The process in accordance with claim 5 characterized in that the reaction is carried out in the liquid phase and in the presence of a solvent.

8. The process in accordance with claim 5 characterized in that the reaction is carried out in the liquid phase and in the presence of benzene.

9. Process for the preparation of a lactone of a hydroxy acid, comprising heating an intramolecular anhydride of an aromatic dicarboxylic acid while intimately admixed with hydrogen, in the presence of a catalyst from the group of hydrogenating metals and hydrogenating metal oxides intimately associated with chromium sesquioxide, at a temperature of 100° to 450° C.

10. Process for the preparation of a lactone of a hydroxy acid, comprising heating an intramolecular anhydride of an aromatic dicarboxylic acid while intimately admixed with hydrogen, in the presence of a catalyst from the group of hydrogenating metals and hydrogenating metal oxides intimately associated with chromium sesquioxide at a temperature of 100° to 450° C., and a pressure of 500 to 7000 lbs. per square inch.

11. Process for the preparation of phthalide, comprising heating phthalic anhydride while intimately admixed with hydrogen in the presence of a catalyst comprising copper chromite, at a temperature of 100° to 450° C. and a pressure of 500 to 5000 lbs. per square inch.

12. Process for the preparation of phthalide, comprising heating phthalic anhydride while intimately admixed with hydrogen in the presence of copper chromite at a temperature of 265° C. and a pressure of 3000 lbs. per square inch.

13. The process in accordance with claim 12 characterized in that the reaction is carried out in the liquid phase and in the presence of benzene.

EUCLID W. BOUSQUET.
WILLIAM J. AMEND.